(12) United States Patent
Freas et al.

(10) Patent No.: US 7,057,374 B2
(45) Date of Patent: Jun. 6, 2006

(54) INTERLOCKING CHARGING STANDS

(75) Inventors: Jon Freas, Sterling, IL (US); Luther Langley, Sterling, IL (US)

(73) Assignee: Wahl Clipper Corporation, Sterling, IL (US)

( * ) Notice: Subject to any disclaimer, the term of this patent is extended or adjusted under 35 U.S.C. 154(b) by 91 days.

(21) Appl. No.: 10/614,658

(22) Filed: Jul. 7, 2003

(65) Prior Publication Data

US 2005/0007065 A1    Jan. 13, 2005

(51) Int. Cl.
*H01M 10/46* (2006.01)

(52) U.S. Cl. .................................................. 320/116

(58) Field of Classification Search ................ 320/107, 320/110, 113, 114, 115, 116
See application file for complete search history.

(56) References Cited

U.S. PATENT DOCUMENTS

| | | | |
|---|---|---|---|
| 3,696,283 A | 10/1972 | Ackley, III | |
| 4,672,292 A | 6/1987 | Hernandez | |
| 4,739,242 A * | 4/1988 | McCarty et al. | 320/110 |
| D360,485 S | 7/1995 | Simonelli | D28/73 |
| 5,900,715 A * | 5/1999 | Roberts | 320/115 |
| 5,963,014 A * | 10/1999 | Chen | 320/110 |
| D426,676 S | 6/2000 | Bushman | D28/73 |
| 6,137,260 A * | 10/2000 | Wung et al. | 320/116 |
| D435,938 S | 1/2001 | Bushman | D28/73 |
| 6,204,632 B1 | 3/2001 | Nierescher et al. | |
| D465,304 S | 11/2002 | Bushman | D28/73 |
| D469,221 S | 1/2003 | Cozzolino et al. | D28/73 |
| 2002/0064041 A1 | 5/2002 | Parker | |

FOREIGN PATENT DOCUMENTS

EP      0 246 336      11/1987

* cited by examiner

*Primary Examiner*—Edward H. Tso
(74) *Attorney, Agent, or Firm*—Greer, Burns & Crain, Ltd.

(57) ABSTRACT

An interlocking stand for storing and charging a rechargeable appliance such as a hair trimmer or hair clipper having a rechargeable battery includes a structure for supporting the appliance for storage. The supporting structure has at least one electrical contact for connecting to the appliance and a structure for providing power to the contact. The interlocking stand is also provided with structure that interlocks the stand with at least one other stand.

11 Claims, 6 Drawing Sheets

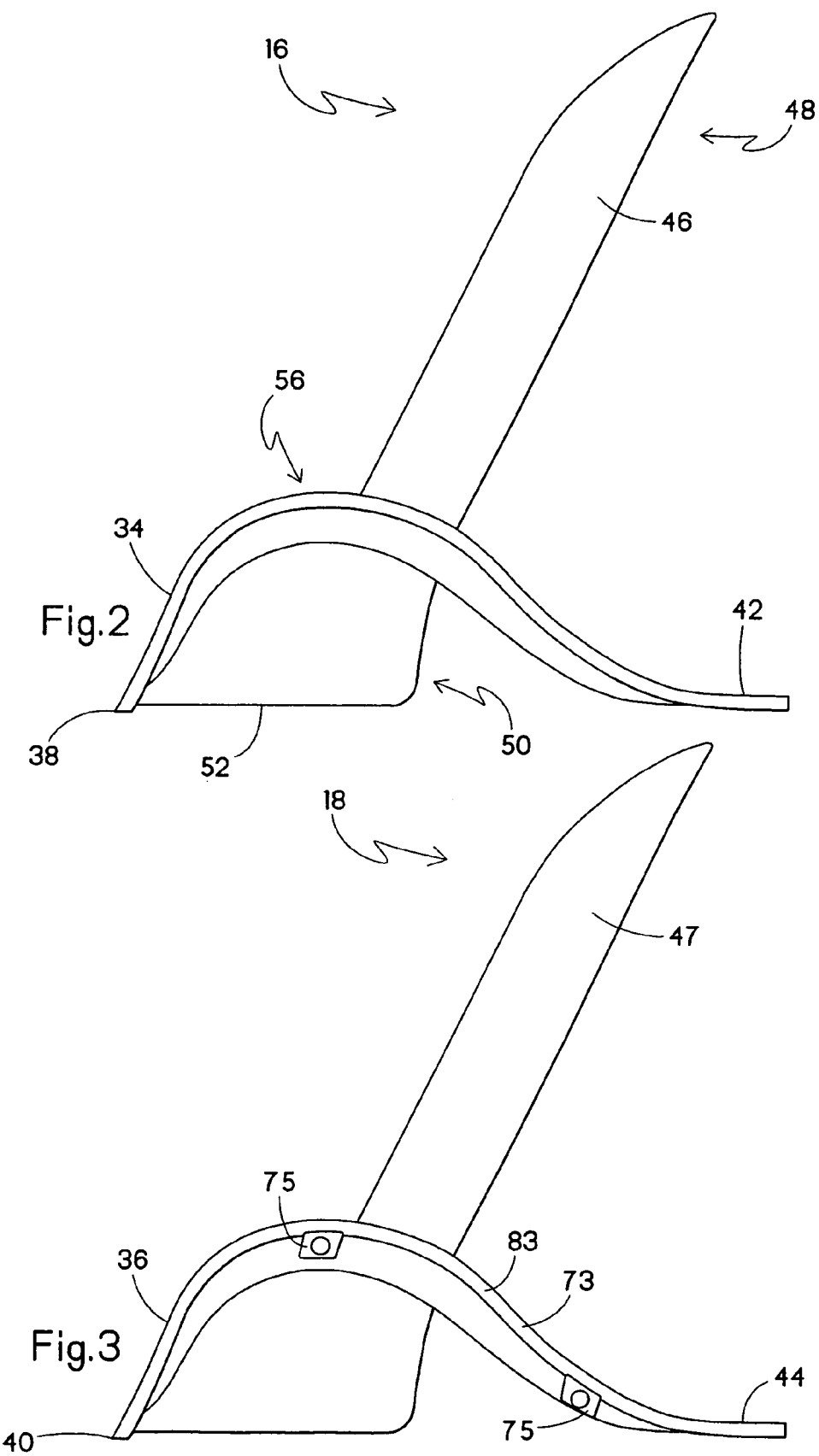

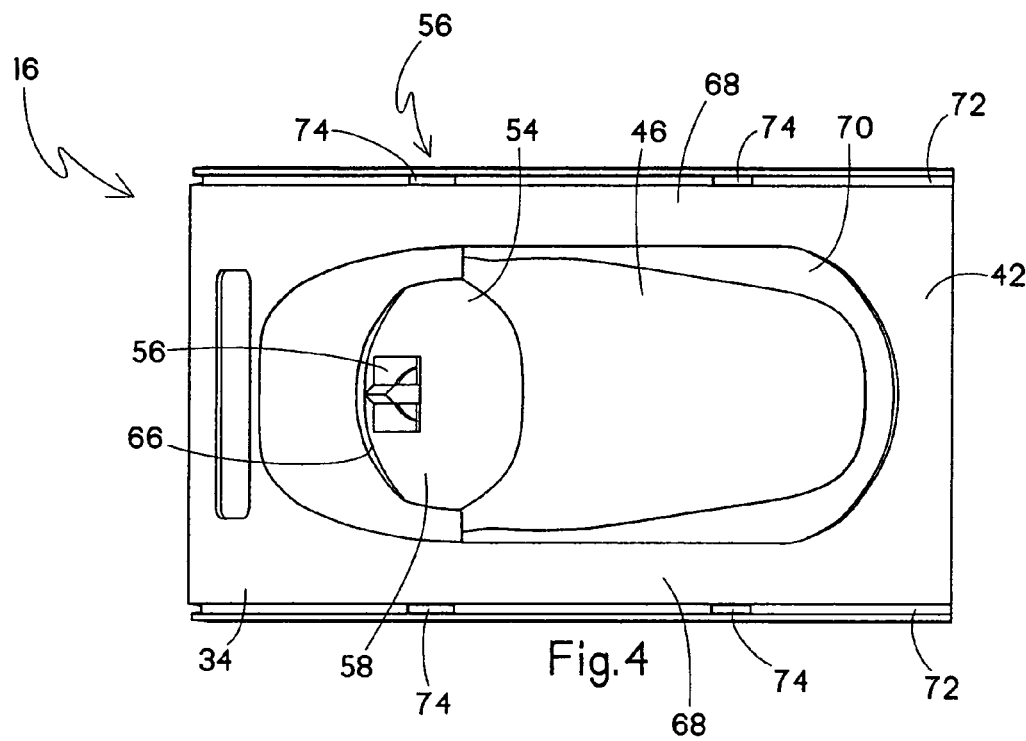
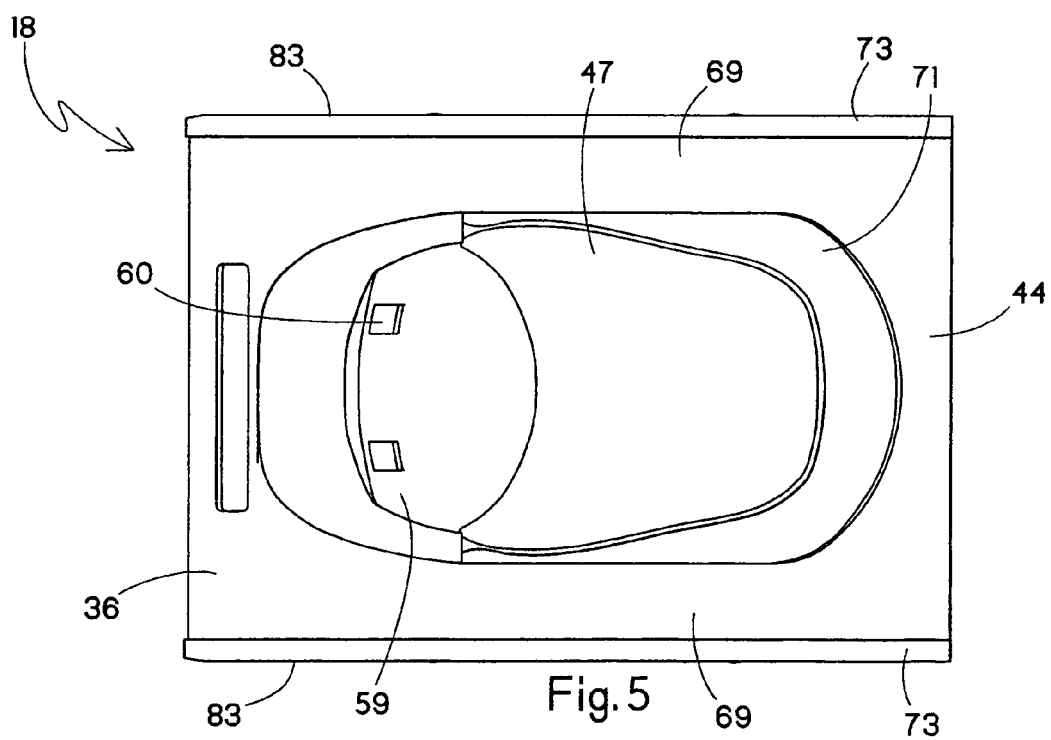

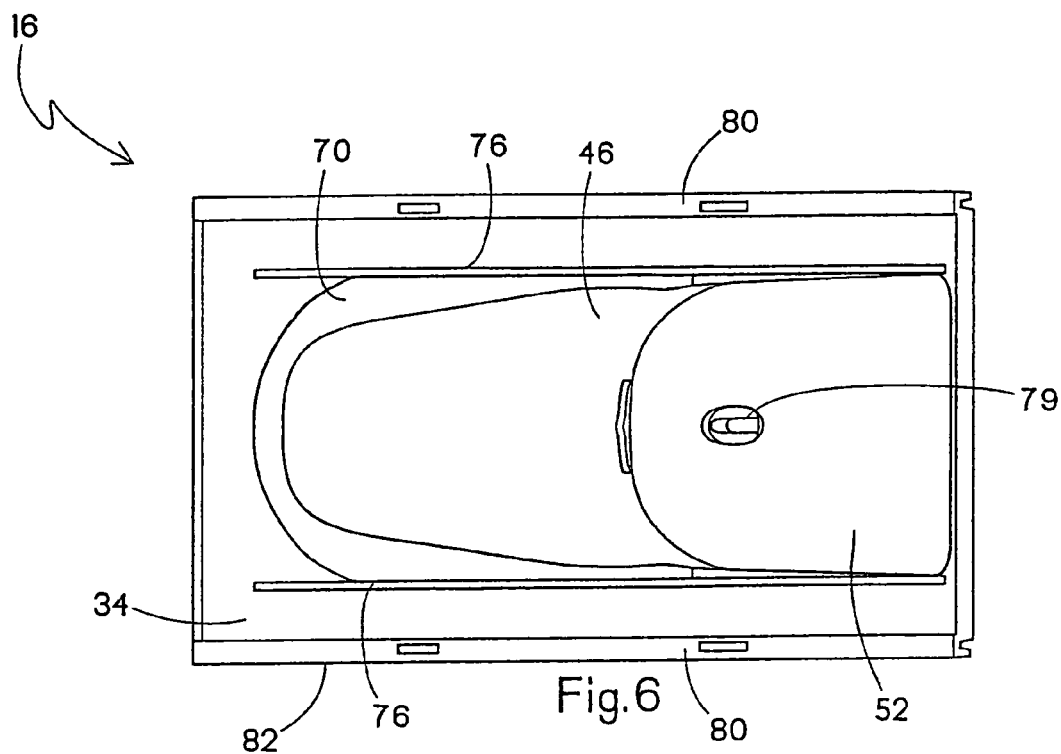
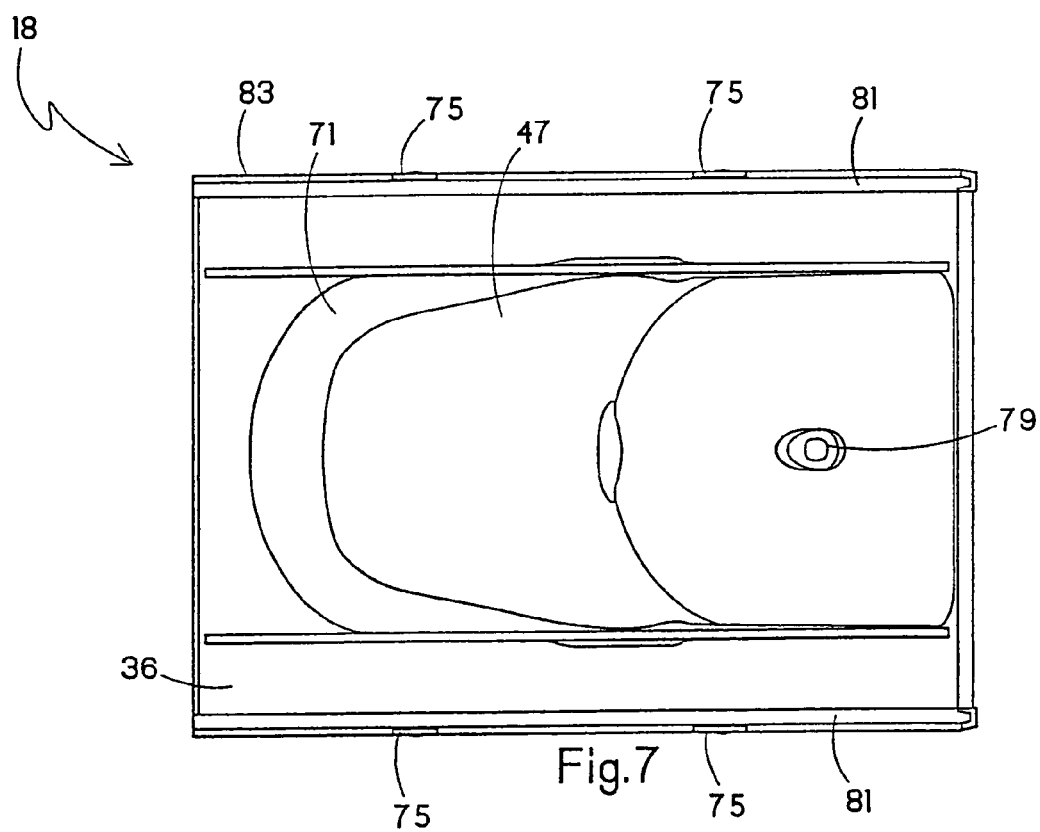

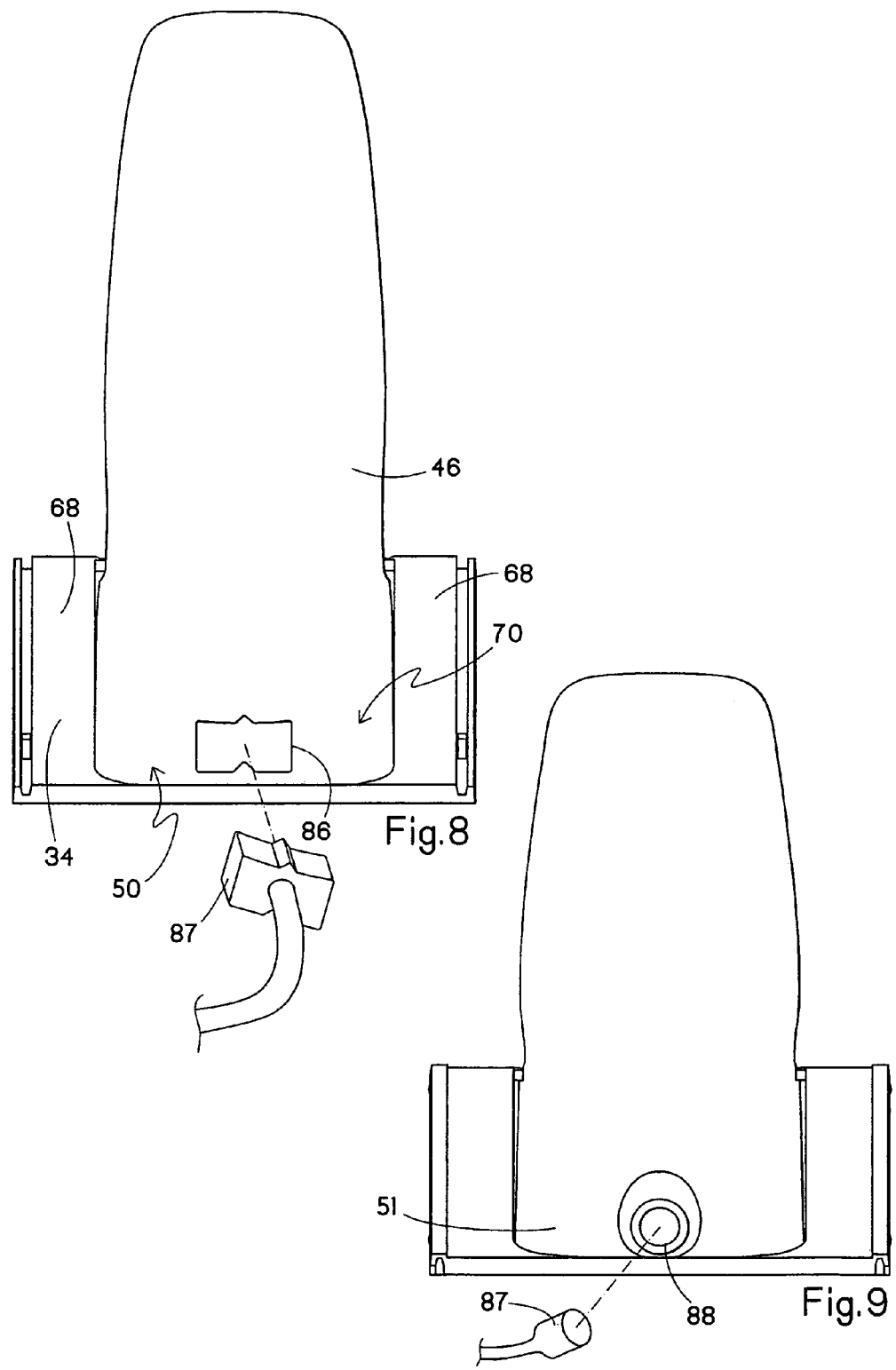

INTERLOCKING CHARGING STANDS

BACKGROUND OF THE INVENTION

This invention relates to charging stands, and in particular, to interlocking charging stands useful in storing and charging hair clippers and/or hair trimmers.

Stands constructed to store and charge rechargeable articles are known in the art. Such stands typically include a base with a cradle configured to support elongate articles such as hair clippers or hair trimmers in an upright or inclined position, allowing the article to make electrical contact with a power source.

Prior art hair clipper and hair trimmer stands have been used for storing the appliances when not in use. One function of the stand is to charge the hair clippers or trimmer when not in use. Many conventional rechargeable electronic appliances engage a stationary stand which is electrically connected to a power supply, such as household current. Upon engagement with the stand, the batteries in the portable unit begin to recharge for the next use.

Another function of the stand is to provide easy access to the clipper, such as by an individual or professional stylist who repeatedly puts the clippers or trimmers down while in use. For example, before trimming a portion of hair, the hair may be required to be combed or otherwise adjusted. Thus, during the hair styling process, the user or stylist may be required to put the trimmer or clipper down and apply a comb or brush to this portion of the hair, and be able to quickly and easily remove the clippers or trimmer from the stand.

Some users, particularly professional stylists, have multiple hair cutting tools on a flat space such as a counter top. The tools sometimes include multiple hair clippers and/or trimmers. A problem with the prior art stands, particularly when used by a professional stylist, is that it is difficult to keep the stands organized in the stylist's work area. Another problem with the prior art stands is that individual stands, and thus individual clippers or trimmers, can become separated from other stands holding related clippers or trimmers. Such separation of stands is a problem when particular clippers or trimmers are ordered in the work space, such as by size of bladeset or other criteria.

SUMMARY OF THE INVENTION

In keeping with one aspect of the invention, an interlocking stand for storing and charging a rechargeable appliance such as a hair trimmer or hair clipper having a rechargeable battery includes a structure for supporting the appliance for storage. The supporting structure has at least one electrical contact for connecting to the appliance and a structure for providing power to the contact. The interlocking stand is also provided with structure that interlocks the stand with one or two other stands.

BRIEF DESCRIPTION OF THE DRAWINGS

FIG. 2 is a side view of the trimmer stand of FIG. 1;
FIG. 3 is a side view of the clipper stand of FIG. 1;
FIG. 4 is a top view of the trimmer stand of FIG. 1;
FIG. 5 is a top view of the clipper stand of FIG. 1;
FIG. 6 is a bottom view of the trimmer of FIG. 1;
FIG. 7 is a bottom view of the clipper of FIG. 1;
FIG. 8 is a back view of the trimmer stand of FIG. 1;
FIG. 9 is a back view of the clipper stand of FIG. 1.

DETAILED DESCRIPTION

Figure 1:
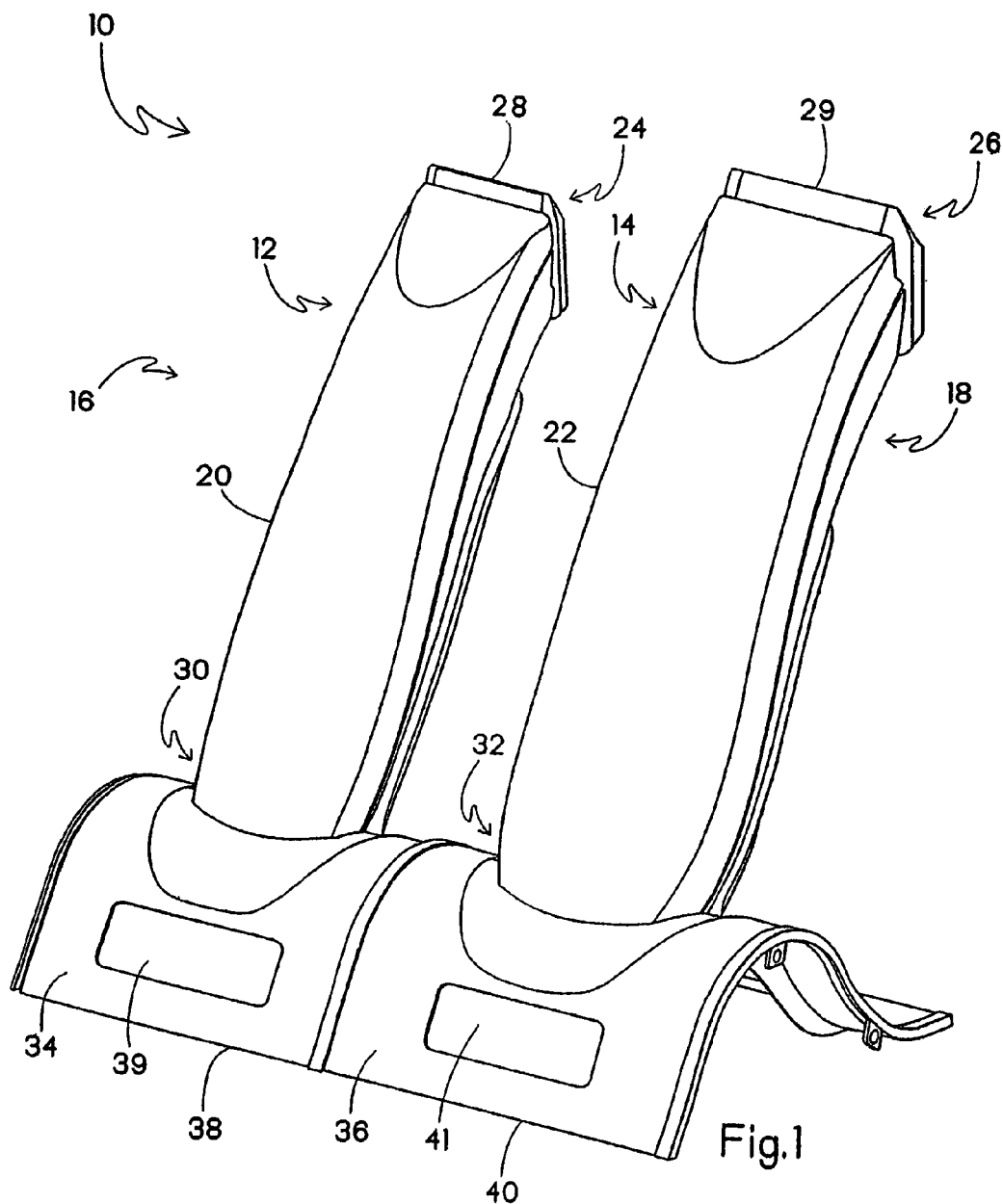
FIG. 1 is a perspective view of an interlocking trimmer and clipper stand of the present invention.

Referring now to FIG 1, an interlocking trimmer and clipper stand is generally designated 10, and includes preferably portable rechargeable units, such as trimmers and clippers 12, 14. A trimmer stand 16 and a clipper stand 18 are engaged for recharging the trimmer 12 and the clipper 14. The rechargeable units 12, 14 are a hair trimmer and a hair clipper, but the present invention is contemplated as being utilized with other rechargeable electric devices including shavers or other appliances using charging stands. Alternatively, the stand 10 may hold appliances that do not have rechargeable batteries or require recharging on the stand. The stands are preferably plastic but may be any other material suitable for holding a rechargeable or non-rechargeable unit.

The trimmer 12 and clipper 14 include housings 20, 22 with working ends 24, 26 which are equipped with bladesets 28, 29. On the opposite end of the housings 20, 22 from the working ends 24, 26 are charging ends 30, 32. The charging ends 30, 32 may have a pair of contacts (not shown).

The trimmer stand 16 and the clipper stand 18 have a trimmer base 34 and a clipper base 36, respectively, for supporting the interlocking stand 10, and the trimmer stand and the clipper stand individually, upon a substrate such as a table or shelf. Both the trimmer base 34 and the clipper base 36 have essentially the same configuration and are generally curved in profile.

Referring now to FIGS. 1–3, supports for the bases 34, 36 are along a front edge 38, 40 and a back platform 42, 44. A generally flat region 39, 41 may also be located above the front edge 38, 40 and may be suitable for identification of the brand, the type of rechargeable unit, or may indicate "his" and "hers". Although the interlocking stand 10 is illustrated as having two stands, it should be understood that the number of stands is not limited to two, but may incorporate as many stands as the user pleases. Additionally, the order of the stands is also variable.

The trimmer stand 16 and the clipper stand 18 are substantially similar, and are both described with reference to the trimmer stand unless otherwise indicated.

The trimmer stand 16 has a cradle 46 curved corresponding to the curvature of the trimmer 12 (the clipper stand 18 has a cradle 47 curved corresponding to the clipper 14), and may be upright or slightly inclined with respect to the base 34. The cradle 46 extends the full height of the stand 16 and includes an upper end 48 and a lower end 50 having a spoon shape. Additionally, the lower end 50 has a bottom 52 providing support to the stand 16 and contacting the substrate.

Referring now to FIGS. 2–5, a feature of the trimmer stand 16 is that the trimmer base 34 and the cradle 46 define a docking recess 54 for receiving the trimmer 12. An upper end 55 of the base 34 and the lower end 50 of the cradle 46 support the charging end 30 of the trimmer 12 when docked in the recess 54. A floor 58 which is provided with at least one contact 56 is disposed at the bottom of the docking recess 54.

Typically, there are two contacts 56 on each of the trimmer 12 and the trimmer base 34 which are located in adjacent relationship to each other. While the preferred embodiment has two contacts 56, it is contemplated that the number, positioning and type of contacts may vary to suit the application, provided there is at least one contact 56 constructed and arranged for making physical and electrical contact with a contact on the trimmer 12. Additionally, with respect to the clipper stand 18 (as shown in FIG. 5), a floor 59 may have contacts 60 spaced a distance apart. Recharging is achieved by the electrical connection between the trimmer 12 and the base 34, and the connection is typically maintained through the physical engagement of the corresponding metallic contacts 56, 60.

The contacts 56, 60 may be configured for causing an enhanced, more consistent wiping contact action between the contact on the trimmer 12 and the contacts on the base 34. In the preferred embodiment, the wiping engagement is created by the contacts 56, 60 forming an inclined surface, but the contacts may also be flush or recessed, depending on the configuration of the contacts on the trimmer 12.

Also included in the docking recess 54 is a curved wall 66 which preferably corresponds to the curvature of the trimmer 12 at the charging end 32. The docking recess 54 forms receptacle for the charging end 32 and the curved wall 66 extends upwardly a length suitable to maintain the trimmer 12 in the recess.

Referring to FIG. 1, during the insertion of the trimmer 12 into the base 34 or, similarly, the clipper 18 into the base 36, the trimmer 12 is received in the cradle 46, and is removably coupled to the base by sliding the trimmer until the charging end 30 engages the floor 58. An electrical connection results as the contacts on the trimmer 12 touch at least one contact 56 protruding through the contact hole 60.

Referring to FIG. 4, extending around each side of the docking recess 54 are base legs 68 which, with the back platform 42, define a base opening 70. With respect to the trimmer stand 16 only, the leg 68 further has a lateral detent 72 which extends the entire length of the base 34. Further, two holes 74 are disposed in each detent 72 spaced a distance apart along the length of the base 34.

Referring now to FIG. 5, base legs 69 of the clipper stand 18 and back platform 44 define a base opening 71. Each leg 69 does not have a lateral detent, but has a raised rim 73 extending the length of the base 36. Further, the raised rim 73 does not have holes disposed within it.

Figure 10:
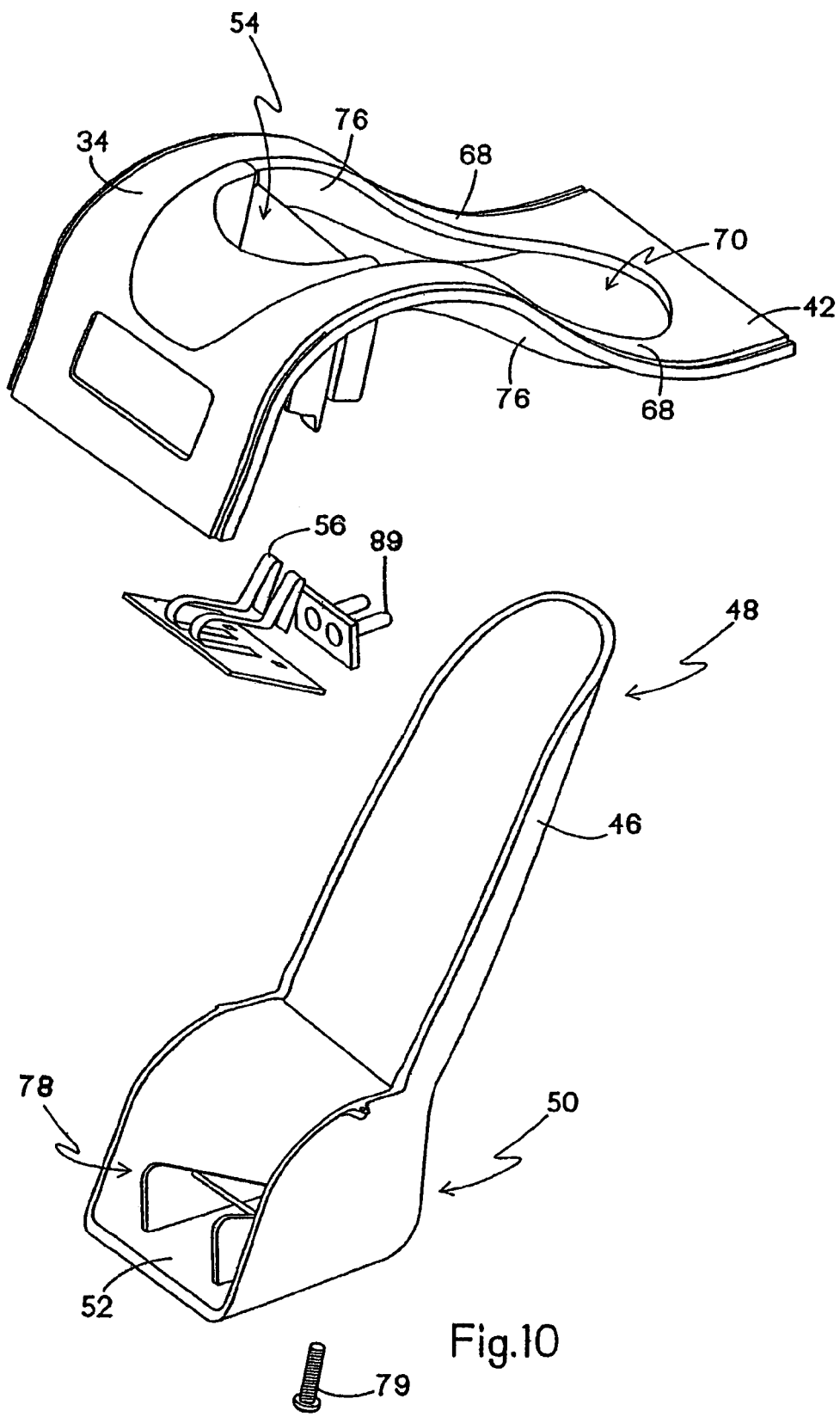
FIG. 10 is an exploded view of the trimmer stand of FIG. 1.

Referring to FIGS. 2–7 and 10, the cradle 46 is disposed in the opening 70 between two ridges 76 and defines an enclosure 78 between the floor 58 of docking recess 54 and the trimmer cradle bottom 52 (shown in FIGS. 6 and 10). The enclosure 78 houses the at least one contact 56, 60. Screws 79, snaps or other fasteners securably hold the cradle 46 and the base 34 together to form the enclosure 78. As seen in FIG. 10. prongs 89 extend from the contact 56 for engagement with an outlet, an extension cord, or the like.

With respect to the clipper stand 18 only, as seen in FIG. 3, two tabs 75 are located on the underside of each raised rim 73 and are disposed along a side edge 83 of the base 36. The tabs 75 are dimensioned to fit within the holes 74 in the lateral detent 72 of the trimmer base 34.

Referring now to FIGS. 6 and 7, the two ridges 76 run the length of the opening 70 and make the base 34 more rigid. With respect to the trimmer base 34, two raised rims 80 are disposed on the underside of the base 34 and run the length of the base 34, each of the rims 80 further having the two holes 74. The rims 80 on the trimmer base 34 are generally similar to the rims 73 on the clipper base 36.

With respect to the clipper base 36, a lateral detent 81 is disposed on the underside of the base 36 and run the length of the base 36. The two tabs 75 are located outwardly of the lateral detent 81 at the side edge 83 and are spaced a distance from the front edge 40 and the back platform 44. While the tabs 75 are configured to fit within the holes 74 on the trimmer stand 16, the side edge 83 of the clipper stand 18 is also configured to nest in the lateral detent 72 of the trimmer stand. Similarly, the side edge 82 of the trimmer stand 16 is configured to nest in the lateral detent 81 of the clipper stand 18.

When the trimmer stand 16 and the clipper stand 18 are securably engaged, the interlocking stand 10 is generally flush along the connection and additional trimmer stands or clipper stands may be added on either side of the interlocking stand. In the preferred embodiment, the clipper stand 18 has the tab configuration and the trimmer has the hole configuration, but it should be understood that various engagements of the stands may be used, including, but not limited to latches, lugs, or any other mechanical or magnetic attachment. Additionally, although the preferred embodiment incorporates a mating configuration to lockingly engage the stands together, it is also contemplated that other configurations may be used that lockingly engage or merely lodge the stands in a particular position with respect to another stand. Further, the engagements of the stands are contemplated as being asymmetrical and should not be limited to symmetrical configurations.

Referring now to FIGS. 8 and 9, located centrally on the trimmer cradle lower end 50 is an aperture 86 configured to receive an input such as a power cord 87. When the cord 87 is mated with the aperture 86, the connection is between the legs 68 of the base 34 and between the base and the cradle 46. Further, when the cord 87 is engaged in the aperture 86, the cord may either pass through the base opening 70 or pass under the legs 68 and out the side of the base 34. Similarly, with respect to the clipper stand 18, an aperture 88 is located on the cradle lower end 51 and is configured to receive an input. The apertures 86, 88 may be similar or may be configured to receive different inputs. Additionally, when the cord 87 is connected to the aperture 88 of the clipper stand 18, the cord may similarly exit the periphery of the stand. In this manner, the connection of the cord 87 at the input is shielded by the stand and the likelihood of the connection coming loose or becoming damaged is lessoned.

While particular embodiments of the interlocking stand for a rechargeable unit has been shown and described, it will be appreciated by those skilled in the art that changes and modifications may be made thereto without departing from the invention in its broader aspects and as set forth in the following claims.

We claim:

1. An interlocking stand for storing and charging a rechargeable appliance and configured for interlocking with another adjacent charging and storing stand having a base with at least one depending tab on a detent located along opposing side edges, the stand comprising:

means for supporting the appliance for storage;

at least one electrical contact inside said supporting means for connection to the appliance;

means for providing power to said at least one electrical contact;

means for interlocking said stand with another stand along opposing side edges;

wherein said means for interlocking is disposed on two sides of the stand, and said means for interlocking is the same on both said sides;

said means for supporting includes a base having at least one side edge having a lateral detent configured for engaging a complementary lateral detent of the other stand; and said means for interlocking includes at least one hole disposed in said detent constructed and arranged for receiving a corresponding tab of the adjacent stand.

2. The interlocking stand of claim 1 wherein said supporting means includes a base and a cradle secured to said base.

3. The interlocking stand of claim 2 wherein said base and said cradle form a docking recess for the appliance.

4. The interlocking stand of claim 1 wherein the appliance is one of a hair trimmer and a hair clipper.

5. A set of interlocking stands for storing and charging rechargeable appliances, the set comprising:
   at least two stands configured to receive the rechargeable appliances;
   means associated with said stands for supporting the appliances for storage;
   at least one electrical contact inside said supporting means for connection to the appliances;
   means for providing power to said at least one electrical contact; and
   means for interlocking one of said stands with another stand;
   said at least two stands including a first stand type with a first means for interlocking and a second stand type with a second means for interlocking different from but engageable with said first means for interlocking;
   said means for interlocking is disposed on two sides of each said stand; and said means for interlocking is the same on both said sides of said first and second stand types.

6. The set of interlocking stands of claim 5 wherein a first stand of said plurality of stands includes a base, and said interlocking means comprises at least one tab disposed on said base and configured to engage another of said stands.

7. The set of interlocking stands of claim 6 wherein a second stand of said plurality of stands includes a base, and said interlocking means comprises at least one hole disposed on said base and configured for receiving said at least one tab of said first stand.

8. The set of interlocking stands of claim 7 wherein said bases are configured so that upon said interlocking engagement, upper surfaces of said first and second stands are generally flush with each other.

9. The set of interlocking stands of claim 5 wherein said supporting means includes a base and a cradle secured to said base.

10. An interlocking stand for charging and storing an appliance, and configured for interlocking with another adjacent charging and storing stand having a base with two side edges having a lateral detent in each edge and at least hole in each said detent, said stand comprising:
    means for supporting the appliance for storage, said supporting means including a base having at least one side edge having a lateral detent configured for engaging the complementary lateral detent of the other stand; and
    means for interlocking the stand with the other stand, said means for interlocking including at least one tab disposed on said base for depending from said edge and configured to engage a corresponding one of the holes in the detent on the other interlocking stand;
    wherein said means for interlocking is disposed on two sides of said stand, and said means for interlocking is the same on both said sides.

11. The interlocking stand of claim 10 wherein said means for interlocking is configured so that when said stand is interlocked with the other stand, upper surfaces of said stand and the other stand are generally flush.

\* \* \* \* \*